(12) United States Patent
Oh et al.

(10) Patent No.: US 10,933,575 B2
(45) Date of Patent: Mar. 2, 2021

(54) APPARATUS AND METHOD FOR FORMING POUCH CASE FOR SECONDARY BATTERY

(71) Applicant: LG Chem, Ltd., Seoul (KR)

(72) Inventors: Sei-Woon Oh, Daejeon (KR); Sun-Hwak Woo, Daejeon (KR); Soo-Ji Hwang, Daejeon (KR); Hyun-Min Kim, Daejeon (KR); Eun-Ju Lee, Daejeon (KR)

(73) Assignee: LG Chem, Ltd.

( * ) Notice: Subject to any disclaimer, the term of this patent is extended or adjusted under 35 U.S.C. 154(b) by 269 days.

(21) Appl. No.: 15/749,668

(22) PCT Filed: Apr. 11, 2017

(86) PCT No.: PCT/KR2017/003925
§ 371 (c)(1),
(2) Date: Feb. 1, 2018

(87) PCT Pub. No.: WO2017/179898
PCT Pub. Date: Oct. 19, 2017

(65) Prior Publication Data
US 2018/0243966 A1    Aug. 30, 2018

(30) Foreign Application Priority Data

Apr. 15, 2016 (KR) .......... 10-2016-0046299
Apr. 7, 2017 (KR) .......... 10-2017-0045404

(51) Int. Cl.
*B29C 51/10* (2006.01)
*H01M 2/02* (2006.01)
(Continued)

(52) U.S. Cl.
CPC .............. *B29C 51/10* (2013.01); *B29C 33/24* (2013.01); *B29C 51/14* (2013.01); *B29D 99/006* (2013.01);
(Continued)

(58) Field of Classification Search
CPC combination set(s) only.
See application file for complete search history.

(56) References Cited

U.S. PATENT DOCUMENTS

| 2011/0205485 | A1* | 8/2011 | Sonzogni | ............ B29C 43/3642 |
| | | | | 351/124 |
| 2015/0091217 | A1* | 4/2015 | Araki | .................. B29C 37/0032 |
| | | | | 264/447 |
| 2016/0200015 | A1* | 7/2016 | Barlag | .................... B29C 43/18 |
| | | | | 425/112 |

FOREIGN PATENT DOCUMENTS

| CN | 102149531 A | 8/2011 |
| CN | 104669596 A * | 6/2015 |

(Continued)

OTHER PUBLICATIONS

English Translation of KR20060067809. (Year: 2006).*

(Continued)

*Primary Examiner* — Jacob T Minskey
*Assistant Examiner* — Adrien J Bernard
(74) *Attorney, Agent, or Firm* — Lerner, David, Littenberg, Krumholz & Mentlik, LLP

(57) ABSTRACT

An apparatus and method are provided for forming a pouch case with improved forming quality and minimized surface contact between the forming apparatus and the pouch case in the forming process to form a pouch cup. The apparatus includes a mold on which a pouch case with a plate shape can be placed, wherein the mold bulges upwards, a chamber open at bottom to the pouch case and the mold, the chamber having an inner space in which the mold can be received by lift-up of the mold or lift-down of the chamber, wherein the chamber is seated on an edge portion of the pouch case, and the chamber is equipped with a fluid input valve at top and a fluid output valve at bottom, and a fluid supply unit
(Continued)

configured to supply a fluid via the fluid input valve to carry out pressure forming of the pouch case.

21 Claims, 7 Drawing Sheets

(51) Int. Cl.
*H01M 10/04* (2006.01)
*B29C 33/24* (2006.01)
*B29D 99/00* (2010.01)
*B29C 51/14* (2006.01)
B29C 51/00 (2006.01)
B29C 43/36 (2006.01)
B29K 23/00 (2006.01)
B29K 67/00 (2006.01)
B29K 105/00 (2006.01)
B29L 31/34 (2006.01)

(52) U.S. Cl.
CPC ......... *H01M 2/026* (2013.01); *H01M 2/0207* (2013.01); *H01M 2/0287* (2013.01); *H01M 10/0436* (2013.01); *B29C 51/00* (2013.01); *B29C 2043/3649* (2013.01); *B29K 2023/12* (2013.01); *B29K 2067/003* (2013.01); *B29K 2105/256* (2013.01); *B29L 2031/3468* (2013.01)

(56) References Cited

FOREIGN PATENT DOCUMENTS

| CN | 104669596 A | | 6/2015 | |
|---|---|---|---|---|
| EP | 0367139 A2 | | 5/1990 | |
| EP | 2724841 | * | 4/2014 | ............ B29C 35/02 |
| EP | 2724841 A1 | | 4/2014 | |
| JP | H11045688 A | | 2/1999 | |
| JP | 2006172879 A | | 6/2006 | |
| KR | 20060067809 | * | 6/2006 | ........... B29C 51/085 |
| KR | 20060067809 A | | 6/2006 | |
| KR | 20140047085 A | | 4/2014 | |
| KR | 20150089556 A | | 8/2015 | |
| KR | 20150003358 U | | 9/2015 | |

OTHER PUBLICATIONS

CN104669596 Translation (Year: 2015).*
Search report from International Application No. PCT/KR2017/003925, dated Aug. 3, 2017.
Extended European Search Report for Application No. EP17782653.4 dated May 11, 2018.
Search Report from Chinese Office Action for Application No. 201780002952.9 dated Mar. 31, 2020; 2 pages.
Liu, J. Plastic Product and Mold Design Proposal, published by China Light Industry Press, Jun. 2001; ISBN: 7-5019-3104-6/TQ-240; Beijing, China; pp. 214-216; including partial translation.
Reasearch Society of Superplastics, Superplastic and Metal Processing Technique, published by China Machine Press, Nov. 1985; Unified Book No. 15033-6027; Beijing, China; pp. 135-136; including partial translation.

* cited by examiner

APPARATUS AND METHOD FOR FORMING POUCH CASE FOR SECONDARY BATTERY

CROSS-REFERENCE TO RELATED APPLICATIONS

The present application is a national phase entry under 35 U.S.C. § 371 of International Application No. PCT/KR2017/003925, filed Apr. 11, 2017, published in Korean, which claims priority from Korean Patent Application No. 10-2016-0046299 filed in the Republic of Korea on Apr. 15, 2016 and Korean Patent Application No. 10-2017-0045404 filed in the Republic of Korea on Apr. 7, 2017, the disclosures of which are incorporated herein by reference in their entireties.

TECHNICAL FIELD

The present disclosure relates to technology to manufacture a secondary battery, and more particularly, to an apparatus and method for forming a pouch case for a secondary battery without relying on a deep drawing process using a forming die.

BACKGROUND ART

Recently, with the fast growing demand for portable electronic products such as laptop computers, video cameras and mobile phones and the extensive development of electric vehicles, accumulators for storing energy, robots and satellites, high performance secondary batteries that are rechargeable repeatedly are being actively studied.

Currently commercially available secondary batteries include nickel cadmium batteries, nickel hydrogen batteries, nickel zinc batteries and lithium secondary batteries, and among them, lithium secondary batteries are gaining more attention than nickel-based secondary batteries because of their advantages; lithium secondary batteries have little or no memory effects so that they can be freely charged and discharged, and they have a very low self-discharge rate and high energy density. Generally, secondary batteries can be classified into can-type secondary batteries and pouch-type secondary batteries according to the case or the type of application. Advantages of pouch-type secondary batteries are that they have freedom in appearance and dimension and are used after assembling to conform to the shape of devices in which the batteries are used or to suit the purpose.

FIG. 1 is an exploded perspective view showing configuration of a conventional pouch-type secondary battery, and FIG. 2 is an assembled diagram of the pouch-type secondary battery of FIG. 1. As shown in FIG. 1, the pouch-type secondary battery generally includes an electrode assembly 20 and a pouch case 10 in which the electrode assembly 20 is received, and the electrode assembly 20 has a basic structure consisting of a positive electrode plate, a separator, and a negative electrode plate, in which a positive electrode tab extends from the positive electrode plate and a negative electrode tab extends from the negative electrode plate.

Referring to FIGS. 1 and 2, the electrode assembly 20 is received in a space formed by the pouch case 10 including an upper pouch 11 and a lower pouch 12, and sealers formed along the peripheral surfaces of the upper pouch 11 and the lower pouch 12 are adhered to each other. Generally, the electrode assembly 20 and the pouch are combined such that parts of the positive electrode lead 21 extending from the positive electrode tab and the negative electrode lead 22 extending from the negative electrode tab are exposed to outside for electrical connection to an external terminal or device. In relation to this, according to embodiments, an adhesive film may be additionally used for attachment or adhesion of the electrode leads 21, 22 to the pouch.

The pouch case 10 performs function to protect a battery cell including the electrode assembly 20 and an electrolyte solution introduced therein by a subsequent process. Furthermore, the pouch case 10 has an aluminum thin film interposed therein to improve the electrical and chemical properties of the battery cell and enhance the heat resistance. In this instance, to ensure insulation of the battery cell from outside, an insulation layer formed by coating an insulating material such as polyethylene terephthalate (PET) resin or nylon resin is formed on an exterior of the aluminum thin film. Meanwhile, an adhesion layer of casted polypropylene (CPP) or polypropylene (PP) is formed at the interface between the upper pouch 11 and the lower pouch 12 for adhesion therebetween.

The pouch case 10 for a secondary battery constructed as described above needs to have a concave inner space to receive the electrode assembly in the upper pouch 11 and/or the lower pouch 12 as shown in FIGS. 1 and 2. Furthermore, the pouch case 10 is also called a pouch cup because of a similar shape to a cup.

According to the conventional art, to form a concave portion in the pouch case 10, generally deep drawing using a forming die is widely used for forming of a pouch manufactured in a plate shape. That is, using a forming die including a die and a punch of metal material, a pouch case with a plate shape is placed on the die and pressed with the punch to form a concave portion for receiving an electrode assembly in the pouch case.

However, in the case of this forming process, the forming die of metal material and the pouch case are brought into direct contact, causing a problem. For example, when the pouch case comes into contact with the forming die, locally serious deformation may occur in the contact portion by friction or stress according to the roughness or material properties of the forming die, and may be damaged by foreign matter on the surface of the forming die. If the pouch case is damaged, causing defects such as cracks, pin holes may occur, in worse cases, leading to breakage, and an electrolyte solution may leak through the defective portions and dielectric breakdown may occur. Accordingly, there is a reduction in quality and yield of the pouch case and a secondary battery including the same.

Moreover, because the forming die includes the die and the punch with fixed shape, forming using the forming die has size limitations and the increased weight of the forming die itself, posing significant limitations on the freedom of use of the forming die.

DISCLOSURE

Technical Problem

The present disclosure is designed to solve the problem, and therefore, the present disclosure is directed to providing an apparatus and method for forming a pouch case with improved forming quality and minimized surface contact between the forming apparatus and the pouch case in the forming process to form a pouch cup.

Other objects and advantages of the present disclosure will be understood from the following description, and will be seen more clearly from the embodiments of the present disclosure. Furthermore, it will be easily apparent that objects and advantages of the present disclosure can be realized by the means or method defined in the appended claims, and their combination.

Technical Solution

To achieve the object, an apparatus for forming a pouch case according to the present disclosure is an apparatus for forming a pouch case for a secondary battery, and includes a mold on which a pouch case with a plate shape can be placed, wherein the mold bulges upwards, a chamber that is open at bottom to the pouch case and the mold, the chamber having an inner space in which the mold can be received by lift-up of the mold or lift-down of the chamber, wherein the chamber is seated on an edge portion of the pouch case to carry out guide forming of the pouch case, and the chamber is equipped with a fluid input valve at top and a fluid output valve at bottom, and a fluid supply unit configured to supply a fluid via the fluid input valve to carry out pressure forming of the pouch case to conform to the mold.

Preferably, the apparatus for forming a pouch case further includes a flat die on which the mold is placed, and which can hermetically seal the inner space of the chamber when the chamber is seated on the edge portion of the pouch case.

The chamber preferably has a box shape with pressure-resistant design.

The fluid is preferably a high pressure gas.

The pressure applied to the pouch case may be maintained after the chamber is seated on the edge of the pouch case.

The apparatus for forming a pouch case may further include a heating device configured to heat at least one of the chamber, the fluid, and the mold in order to heat the pouch case.

Furthermore, to achieve the object, a method for forming a pouch case according to the present disclosure is a method for forming a pouch case for a secondary battery using the apparatus for forming a pouch case according to the present disclosure, and includes placing a pouch case with a plate shape on a mold, carrying out guide forming of the pouch case by seating a chamber on an edge portion of the pouch case by lift-up of the mold or lift-down of the chamber, and carrying out pressure forming of the pouch case to conform to the mold using a fluid while supplying the fluid via a fluid input valve of the chamber and discharging the fluid via a fluid output valve.

Preferably, the fluid output valve is closed within a pressure-resistant range of the chamber to fill the chamber with the fluid, and when forming is completed, the fluid output valve is opened to discharge the fluid out of the chamber.

To achieve the object, a method for forming a pouch case according to the present disclosure includes placing a pouch case with a plate shape on a mold, carrying out guide forming of the pouch case by pressing an edge portion of the pouch case, and carrying out pressure forming of the pouch case to conform to the mold by supplying a fluid to the pouch case.

In the foregoing methods, the pouch case may be heated during the guide forming and/or the pressure forming.

Particularly, the pouch case may be composed of insulation layer/aluminum thin film/adhesion layer, materials of the insulation layer and the adhesion layer may be polymer, and the pouch case may be heated at temperature that is lower than or equal to temperature at which endothermic reaction starts in a material having lowest deformation temperature from the polymer materials of the pouch case. Alternatively, the pouch case may be heated in a temperature range in which endothermic peak is observed in a material having lowest deformation temperature from the polymer materials of the pouch case.

Particularly, in case that the adhesion layer is made of PP, the pouch case may be heated at 100° C. or less, or in a range of 140–160° C.

Advantageous Effects

According to the present disclosure, in the forming of a pouch case in the shape of a pouch cup to receive an electrode assembly, it is possible to minimize the surface contact between the pouch case and the forming apparatus.

Thus, it is possible to prevent or reduce damage to the surface caused by impacts applied to a pouch case or friction due to the contact with a forming die in the forming of a conventional pouch case.

Accordingly, it is possible to prevent electrolyte solution leaks caused by damage in the pouch case or dielectric breakdown caused by exposure of an aluminum thin film, obtaining a pouch case with improved forming quality.

The apparatus for forming a pouch case according to the present disclosure only needs to change the shape of a mold while keeping a chamber unchanged, achieving forming with more complex shape. Furthermore, it can reduce or remove machine conventionally used to operate the forming die, and ensures uniformity of finished products.

The present disclosure performs primary shaping through guide forming with significantly lower stress burden and presses the pouch case almost in all directions through the fluid pressure to prevent stress concentration on a certain area, thereby remarkably reducing cracking.

BRIEF DESCRIPTION OF THE DRAWINGS

The accompanying drawings illustrate preferred embodiments of the present disclosure, and together with the detailed description, serve to provide a further understanding of the technical aspects of the present disclosure, and thus, the present disclosure should not be construed as being limited to the disclosure stated in the drawings.

MODE FOR CARRYING OUT THE INVENTION

Figure 1:
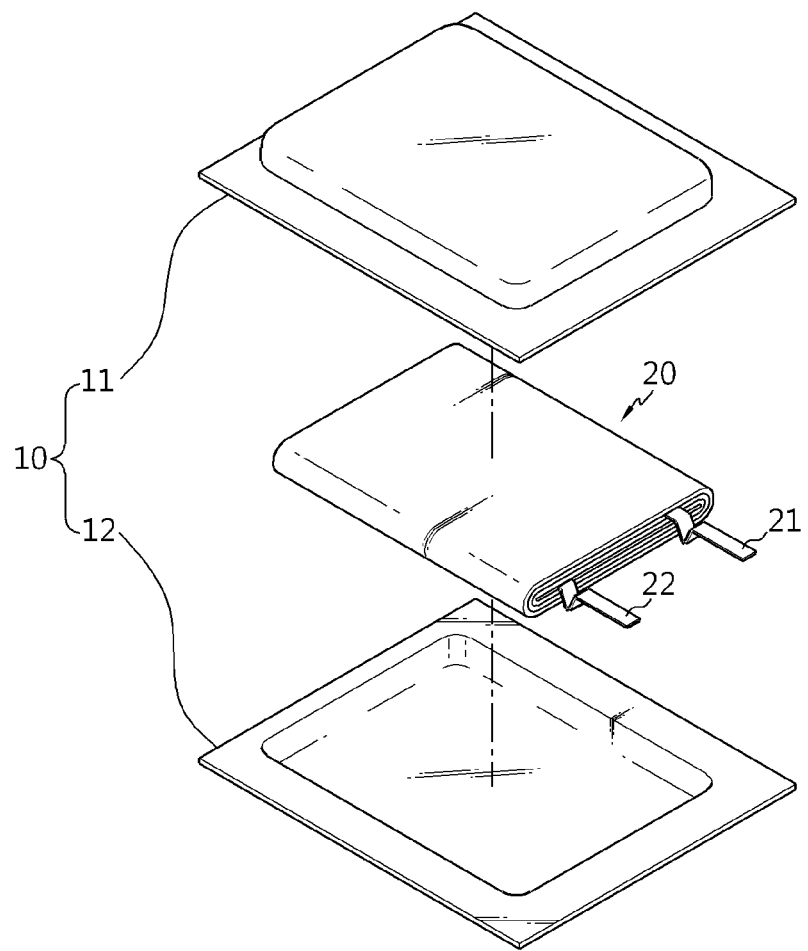
FIG. 1 is an exploded perspective view showing configuration of a conventional pouch-type secondary battery.
Figure 2:
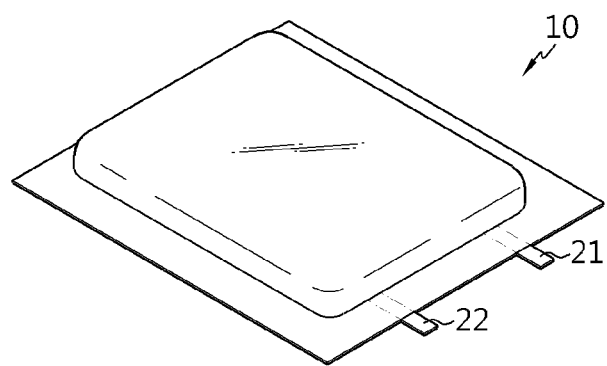
FIG. 2 is an assembled diagram of the pouch-type secondary battery of FIG. 1.

Hereinafter, the preferred embodiments of the present disclosure will be described in detail with reference to the accompanying drawings. However, the embodiments of the present disclosure may be modified in many different forms, and the scope of the present disclosure should not be construed as limited to the following embodiments. The embodiments of the present disclosure are provided to help those having ordinary skill in the art fully understand the present disclosure.

The terms or words used in the specification and the appended claims should not be construed as limited to general and dictionary meanings, but interpreted based on the meanings and concepts corresponding to the technical aspects of the present disclosure on the basis of the principle that the inventor is allowed to define terms appropriately for the best explanation.

Therefore, the embodiments stated herein and illustrations in the drawings are just a most preferred embodiment of the present disclosure and does not fully represent the technical concept of the present disclosure, so it should be understood that there may be various equivalents and modifications for alternative embodiments at the time the application is filed.

Figure 3:
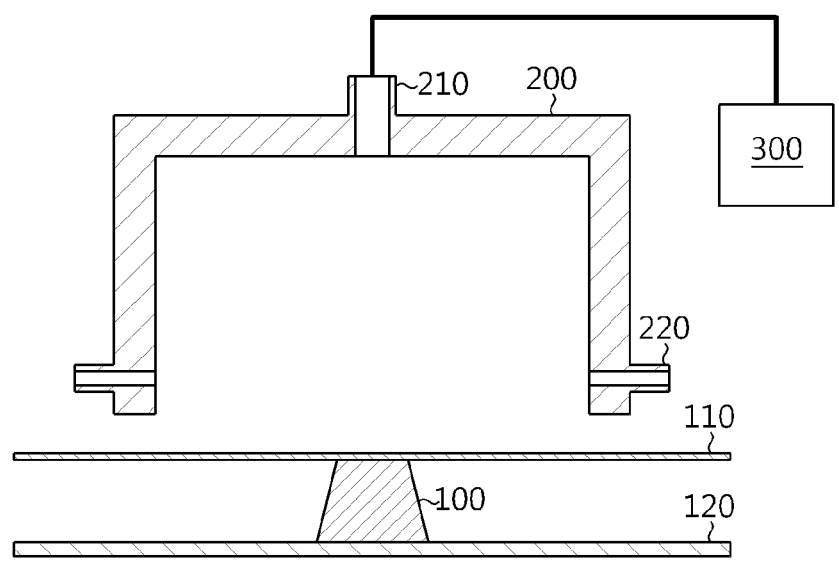
FIGS. 3 to 5 are diagrams illustrating an apparatus for forming a pouch case according to a preferred embodiment of the present disclosure and a method for forming a pouch case using the same.
Figure 4:
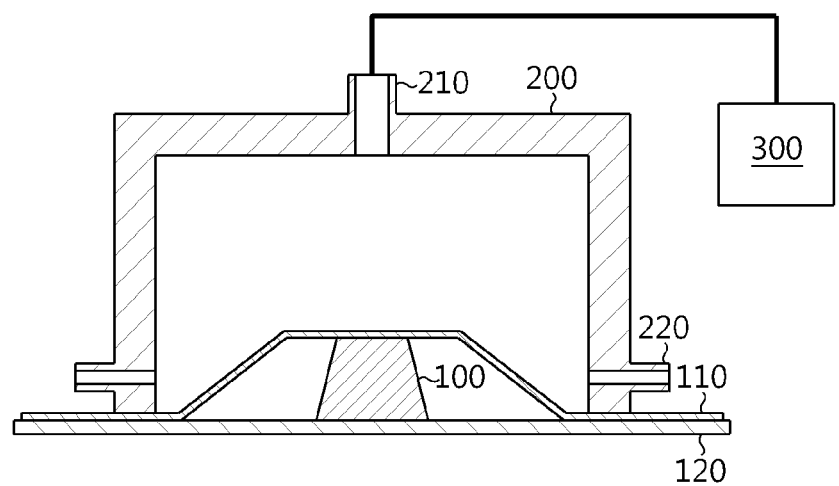
Figure 5:
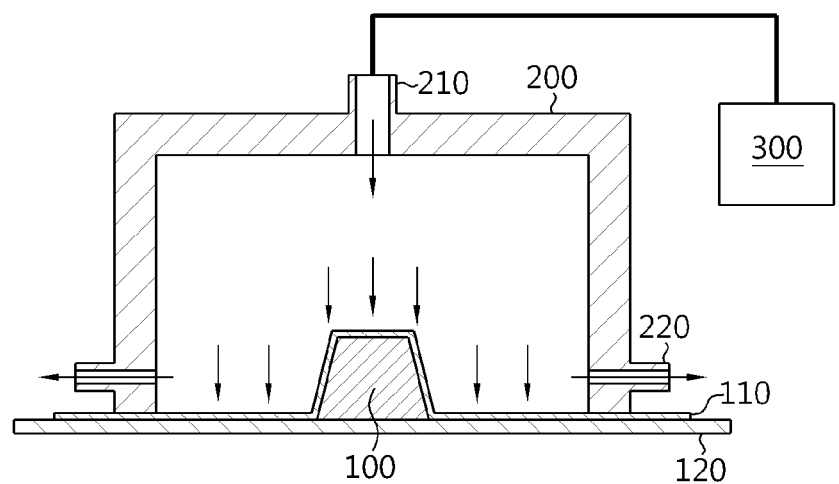

FIGS. 3 to 5 are diagrams illustrating an apparatus for forming a pouch case according to a preferred embodiment of the present disclosure and a method for forming a pouch case using the same.

Referring to FIG. 3 first, the apparatus for forming a pouch case according to the present disclosure includes a mold 100, a chamber 200, and a fluid supply unit 300.

The mold 100 has a shape and a size corresponding to a pouch cup to be formed, and conforms to dimensions of a real product. The mold 100, on which a pouch case 110 with a plate shape can be placed, bulges upwards on the bottom, preferably a flat die 120.

The flat die 120 is a member on which the mold 100 is placed and that can hermetically seal an inner space of the chamber 200 when the chamber 200 is seated on the edge portion of the pouch case 110, and when a work table is provided, the flat die 120 may be omitted.

Meanwhile, the pouch case 110 that is seated on the mold 100 has a plate shape, and this represents that the pouch case 110 is formed in a wide plate shape, but not necessarily a perfectly flat shape, and the plate shape is a shape before a concave portion, i.e., a cup portion, is formed in the pouch case 110. The pouch case 110 may have a structure including an insulation layer formed by coating an insulating material such as PET resin or nylon resin/an aluminum thin film/an adhesion layer of CPP or PP.

As shown in FIG. 3, the chamber 200 has a hollow space inside to receive the mold 100 and is opened to the pouch case 110 and the mold 100 at the bottom, and the chamber 200 may be provided on the apparatus for forming a pouch case. However, the term "on" may be replaced with "under" or "beside" depending on a viewing position of an observer or position on which the apparatus for forming a pouch case is placed, and this is equally applied to the below mentioned.

The chamber 200 preferably has a box shape with pressure-resistant design, and has a fluid input valve 210 at top and a fluid output valve 220 at bottom.

The fluid supply unit 300 may include a fluid storage means (e.g., gas bombe), a fluid flow rate adjuster (MFC, etc.), a control unit to turn on/off fluid supply, and a fluid pump. Furthermore, the fluid supply unit 300 may also include a control unit to control the opening/closing of the fluid input valve 210 and the fluid output valve 220.

Meanwhile, the apparatus for forming a pouch case may further include a heating device to heat at least one of the chamber 200, the fluid, and the mold 100, so as to heat the pouch case 110. When the flat die 120 is present, the heating device may be configured to heat the flat die 120.

FIG. 4 shows that the chamber 200 is seated on the edge portion of the pouch case 110 by lift-up of the mold 100 (when the flat die 120 is provided, the mold 100 is lifted up by lift-up of the flat die 120) or lift-down of the chamber 200 itself. As described above, the chamber 200 carries out guide forming of the pouch case 110 by pressing the edge portion of the pouch case 110. The guide forming refers to forming to take a rough shape.

As shown in FIG. 4, when the chamber 200 is seated on the edge portion of the pouch case 110, the entire edge portion the pouch case 110 comes into close contact with the flat die 120. The open portion of the chamber 200 is closed by the pouch case 110, so the inner space of the chamber 200 is hermetically sealed to some extent. If the chamber 200 itself is pressed down against the edge of the pouch case 110, the degree of sealing will increase. As described above, the chamber 200 not only carries out guide forming but also fixes the edge portion of the pouch case 110 during a subsequent process.

Subsequent to guide forming, the fluid supply unit 300 supplies a fluid via the fluid input valve 210 to carry out pressure forming of the pouch case 110 to conform to the mold 100 as in FIG. 5. The fluid supplied into the chamber 200 through opening of the fluid input valve 210 is discharged out of the chamber 200 through opening of the fluid output valve 220. The fluid input valve 210 is always placed in open state and may turn on/off fluid supply, and the fluid input valve 210 always turns on fluid supply and may be opened/closed to adjust the feeding into the chamber 200. After the fluid is diffused quickly at nearly the same time as the fluid supply into the chamber 200 to press the pouch case 110, the fluid output valve 220 may be automatically opened by the pressure of the fluid discharged outward, and may be closed within the pressure-resistant range of the chamber 200 through the control unit to fill the chamber 200 with the fluid, and when forming is completed, the fluid output valve 220 may be opened to discharge the fluid outward.

The positions of the fluid input valve 210 and the fluid output valve 220 are set, taking into account favorable fluid dispensing from supply to discharge within the chamber 200 to achieve good pressure forming of the pouch case 110 by the supplied fluid. Furthermore, for uniform fluid supply and discharge, the number of fluid input valves 210 and fluid output valves 220 may be multiple, and in this case, the multiple fluid input valves 210 may be placed in symmetrical positions and the multiple fluid output valves 220 may be placed in symmetrical positions. To assist the discharge of the fluid, fluid suction means may be further provided at the flat die 120.

The fluid is preferably a high pressure air or a non-reactive high pressure gas such as nitrogen or argon, but is not limited to a particular type of gas, and the term "high pressure" as used herein refers to an atmosphere in which the forming operation is performed, and is generally the pressure that is higher than the atmospheric pressure and is in the range of pressure considering the material of the pouch case 110 and the pressure-resistant design of the chamber 200.

As described above, the apparatus for forming a pouch case according to the present disclosure does not have a die and a punch that come into direct contact into a pouch case like the forming die used in conventional forming. The conventional forming die is generally made of a metal material to ensure strength and rigidity, but the mold 100 or the chamber 200 of the apparatus for forming a pouch case according to the present disclosure does not need to be made of a metal material and may be made of various materials. For example, the mold 100 or the chamber 200 may be made of a polymer material. This is because the apparatus for forming a pouch case according to the present disclosure does not form the pouch case along the shape of the die with the aid of the pressing pressure of the punch like the forming die, and forms the pouch case by carrying out guide forming by the chamber and carrying out pressure forming with the aid of the fluid pressure.

Figure 6:
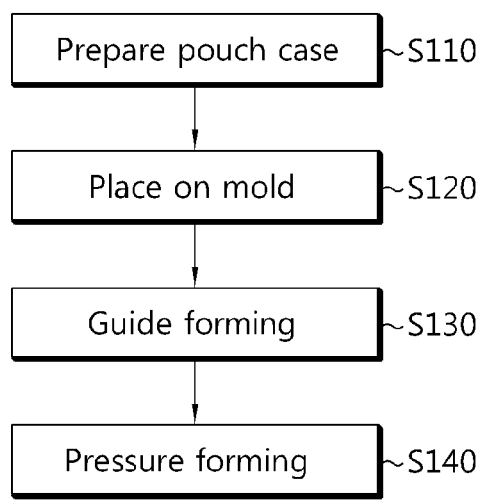
FIG. 6 is a flowchart showing an embodiment of a method for forming a pouch case for a secondary battery using an apparatus for forming a pouch case or a method for forming a pouch case according to the present disclosure.

FIG. 6 is a flowchart showing an embodiment of a method for forming a pouch case for a secondary battery using an apparatus for forming a pouch case or a method for forming a pouch case according to the present disclosure.

The method for forming a pouch case according to the present disclosure forms the pouch case by carrying out pressure forming by the fluid pressure after guide forming, and it is the most efficient to perform the method using the apparatus for forming a pouch case according to the present disclosure described with reference to FIGS. 3 to 5, but the method may be performed by an apparatus having different variation of design from the forming apparatus.

Referring to FIG. 6, to form the pouch case according to the present disclosure, a pouch case with a plate shape is prepared first (S110). Subsequently, the pouch case with a plate shape is placed on a mold (S120).

Guide forming is carried out by pressing the edge portion of the pouch case to take a primary, rough shape (S130). When the apparatus for forming a pouch case according to the present disclosure is used, this step may be performed by lifting up the mold 100 or lifting down the chamber 200 to seat the chamber 200 on the edge of the pouch case. After slowly lifting up the mold 100 or lifting down the chamber 200 to allow the chamber 200 to come into contact with the edge of the pouch case, lifting up of the mold 100 or lifting down of the chamber 200 continues until the chamber 200 and the pouch case come into contact with the work table or the flat die 120. In a predetermined period of time after the chamber 200 and the pouch case completely touch the work table or the flat die 120, guide forming of the pouch case is sufficiently carried out, and the process goes to a next step.

Subsequently, pressure forming of the pouch case is carried out to conform to the shape of the mold (S140). The pressure forming is carried out through supply of a fluid such as a high pressure gas. Particularly, when the apparatus for forming a pouch case according to the present disclosure is used, the pressure forming may be carried out by supplying a fluid into the chamber 200. In this case, forming is carried out by pressing down the pouch case 110 against the mold 100 through the fluid supply into the chamber 200 via the fluid input valve 210 formed in the chamber 200, and the fluid is discharged through the fluid output valve 220 provided at the lower end of the chamber 200. The fluid is injected into the chamber 200 and diffused quickly so that the pouch case is uniformly pressed down against the mold 100 almost in all directions. Accordingly, the pouch case material may be uniformly stretched. The fluid supply and discharge may continue until forming of the pouch case along the shape of the mold 100 is completed.

When forming is completed, the chamber 200 is lifted up or the mold 100 is lifted down to separate the pouch case, and trimming is performed.

The pouch case manufactured by the apparatus and method for forming a pouch case forms a pouch case in the shape of a pouch cup with minimum surface contact between the pouch case and the forming apparatus (the pouch cup portion only touches the mold), and minimum damage to the pouch case. Accordingly, the pouch case manufactured through the apparatus and method for forming a pouch case according to the present disclosure may have high quality.

Furthermore, products with many designs are manufactured only by changing the shape of the mold while keeping the chamber unchanged, achieving forming with more complex shape, and machine conventionally used to operate the forming die may be reduced or removed, while ensuring uniformity of finished products.

Meanwhile, the pouch case may be heated during forming of the pouch case by the method for forming a pouch case according to the present disclosure, allowing for more flexible deformation.

As mentioned previously, the pouch case may have a structure including an insulation layer formed by coating an insulating material such as PET resin or nylon resin/an aluminum thin film/an adhesion layer of CPP or PP. The pouch case may be heated to achieve more flexible deformation within the minimum deformation range of the insulation layer and/or the adhesion layer except the aluminum thin film in the pouch case.

To this end, the apparatus for forming a pouch case as described with reference to FIGS. 3 to 5 can use a method which increases the total internal temperature of the chamber 200 or increases the temperature of the fluid supplied for pressure forming. To increase the total internal temperature of the chamber 200 or the temperature of the fluid, the pouch case may be heated through transfer of heat when the chamber 200 is seated on the pouch case after heating the chamber 200 itself, a suitable heating device may be installed in the chamber 200 to heat the fluid in the chamber 200, a suitable heating device may be installed in the fluid supply unit 300 to supply a pre-heated fluid from the outside of the chamber 200, and the mold 100 and/or the flat die 120 may be heated, and the type and structure of a heating device necessary to implement each method will be understood even though its detailed description is not provided.

In this instance, the heating temperature is important. The material of the insulation layer and/or the adhesion layer except the aluminum thin film in the pouch case is polymer. Deformation of the PP material occupying the largest area is important, and in practice, the PP material has the lowest deformation temperature as compared to the other materials enumerated in the foregoing.

Figure 7:
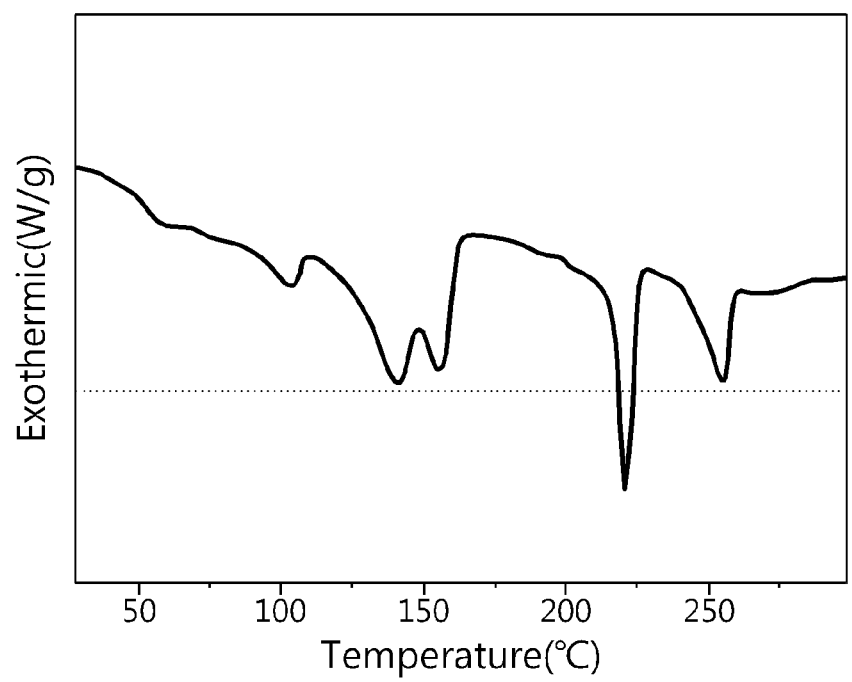
FIG. 7 is a DSC graph of PP material of a pouch case in a method for forming a pouch case according to another preferred embodiment of the present disclosure.

FIG. 7 is a DSC graph of PP material of a pouch case in a method for forming a pouch case according to another preferred embodiment of the present disclosure.

Referring to FIG. 7, in the case of PP material, endothermic reaction starts in the vicinity of 100° C., and endothermic peak is observed at 140~160° C.

Accordingly, in the heating temperature range of the pouch case, a first possible heating temperature range is temperatures at which endothermic reaction starts in a material having the lowest deformation temperature from the polymer materials of the pouch case, and in the case of PP material, 100° C. or less. The temperature range is relatively high temperatures that simply help to make deformation flexible while not changing the properties of all the materials of the pouch case. That is, the temperature enables flexible deformation of the pouch case as safely as possible without changes in properties of materials.

Subsequently, in the heating temperature range of the pouch case, a second possible heating temperature range is a temperature range in which endothermic peak is observed in a material having the lowest deformation temperature from the polymer materials of the pouch case, and in the case of PP material, 140~160° C. This temperature range is lower than the melting point of PP material, and makes PP material flexible to the maximum while maintaining the phase of the material, achieving deformation more naturally.

As described above, taking into account endothermic reaction of a material having the lowest deformation temperature from the polymer materials of the pouch case, when the heating temperature is lower than or equal to the temperature at which endothermic reaction starts, or is in the temperature range in which endothermic peak is observed, guide forming and/or pressure forming can be carried out more flexibly, achieving forming of the pouch case without defects such as wrinkling or crumpling, folding, or breakage, while not causing material deformation to the pouch case.

The following is a description of experimental results that can indirectly demonstrate the effects of the present disclosure by two-step forming including the step for guide forming and the step for pressure forming to conform to the mold.

In comparative example 1, forming of the pouch case is carried out by deep drawing at one time to a target forming depth using a forming die and a punch, and in comparative example 2, forming of the pouch case is carried out by two-step deep drawing including preforming and forming using the same forming die and punch as comparative example 1.

Preforming is primary forming to the smaller depth than the target forming depth, and forming follows preforming and is secondary forming to the target forming depth under the same condition as comparative example 1.

In the two cases, the die for forming a pouch cup had the radius of curvature of the edge portion of 2.0 mm (at the bottom of the pouch cup)/2.5 mm (at the inlet of the pouch cup), and the radius of curvature of the corner portion of 3 mm (at the bottom of the pouch cup)/4 mm (at the inlet of the pouch cup). To make it easy to remove the punch from the pouch cup when lifting up the punch after lifting down, the clearance was set to 1.0 mm. The pressure of a stripper used to hold the pouch case above the forming die was 0.5 MPa. In the case of comparative example 1, the punch was lifted down at 40 mm/sec, and in the case of comparative example 1, the punch was lifted down at 66 mm/sec during preforming and at 40 mm/sec during forming.

In the two cases, for different two types of pouch cases (pouch 1, pouch 2), the maximum deformation depth was investigated by detecting cracking vs forming depth.

The following tables 1 and 2 respectively include data of the maximum deformation depth obtained from comparative example 1 and comparative example 2, showing the results of detecting cracking vs forming depth in different two types of pouch cases.

TABLE 1

| Forming depth (mm) | Number of crack formation | |
|---|---|---|
| | Pouch 1 | Pouch 2 |
| 8.5 | 0/2 | |
| 9 | 0/2 | |
| 9.5 | 1/2 | |
| 10 | 1/4 | |
| 10.5 | 2/3 | 0/5 |
| 11 | | 0/6 |
| 11.5 | | 0/2 |
| 12 | | 4/4 |
| 12.5 | | 1/3 |

TABLE 2

| Forming depth (mm) | Number of crack formation | |
|---|---|---|
| | Pouch 1 | Pouch 2 |
| 12 | 0/10 | |
| 12.5 | 0/10 | |
| 13 | 2/10 | |
| 13.5 | | |
| 14.5 | | 0/10 |
| 15 | | 2/10 |
| 15.5 | | |

As seen from Table 1, in case that forming was carried out at one time by deep drawing as in comparative example 1, for pouch 1, cracking started from the forming depth of 9.5 mm, resulting that the maximum deformation depth was 9 mm, and for pouch 2, cracking started from the forming depth of 12 mm, resulting that the maximum deformation depth was 11.5 mm.

As seen from Table 2, in case that forming was carried out through two steps by deep drawing as in comparative example 2, for pouch 1, cracking started from the forming depth of 13 mm, resulting that the maximum deformation depth was 12.5 mm, and for pouch 2, cracking started from the forming depth of 15 mm, resulting that the maximum deformation depth was 14.5 mm.

When comparing comparative example 1 with comparative example 2, even though the pouch cases are of the same type, the depth enabling forming without cracking is greater in comparative example 2. That is, it can be seen that, comparative example 2 involving forming after preforming significantly increases in the maximum forming depth compared to the experimental results of comparative example 1 involving forming at one time, although they are performed by conventional deep drawing.

The maximum deformation depth becomes an index representing formability. As the maximum deformation depth is greater, better forming of the pouch case in desired shape is achieved. Here, preforming was carried out at room temperature, and when the pouch case is heated in the same way as the present disclosure, the effect will be much greater than comparative example 2.

The present disclosure carries out pressure forming to conform to the mold after carrying out guide forming to take a rough shape. As seen from the previous comparative example, two-step achieves better formability than one-step. Furthermore, the need to use a forming die and a punch is removed, avoiding the problems occurring when they are used. As forming is carried out to conform to the mold through the fluid pressure after guide forming, the pouch case is uniformly stretched over many portions to form a pouch cup, achieving better formability than comparative example 2. In comparative examples 1 and 2, the surface corresponding to the bottom of the pouch cup is unavoidably pressed due to the conventional deep drawing process of uniaxial direction, increasing the likelihood of cracking caused by stress concentration, but the present disclosure take a primary shape under the stress burden greatly reduced through guide forming, and presses the pouch case almost in all directions through the fluid pressure to prevent stress concentration on a certain area, thereby significantly reducing cracking.

While the present disclosure has been hereinabove described with respect to a limited number of embodiments and drawings, the present disclosure is not limited thereto, and it is obvious to those having ordinary skill in the art that various modifications and changes can be made thereto within the technical aspects of the present disclosure and the equivalent scope to which the appended claims are entitled.

What is claimed is:

1. A system for forming a pouch sheet used as an upper pouch or a lower pouch of a pouch case for a secondary battery, comprising:
   a pouch sheet; and
   an apparatus for forming the pouch sheet, including:
      a mold bulging upwards, wherein the pouch sheet is disposed on top of the mold;
      a chamber having a top end, an open bottom end, and an inner space in which the mold can be received, wherein the chamber is seated on an edge portion of the pouch sheet to carry out guide forming of the pouch sheet, and the chamber is equipped with a fluid input valve at the top end and a fluid output valve adjacent the open bottom end; and
      a fluid supply unit configured to supply a fluid via the fluid input valve to carry out pressure forming of the pouch sheet to conform to the mold.

2. The system for forming a pouch sheet according to claim 1, wherein the apparatus further comprises:
   a flat die on which the mold is placed, and which can hermetically seal the inner space of the chamber when the chamber is seated on the edge portion of the pouch sheet.

3. The system for forming a pouch sheet according to claim 1, wherein the chamber has a box shape with pressure-resistant design.

4. The system for forming a pouch sheet according to claim 1, wherein the fluid is a high pressure gas.

5. The system for forming a pouch sheet according to claim 1, wherein the pressure applied to the pouch sheet is maintained after the chamber is seated on the edge of the pouch sheet.

6. The system for forming a pouch sheet according to claim 1, wherein the apparatus further comprises:
   a heating device configured to heat at least one of the chamber, the fluid, and the mold in order to heat the pouch sheet.

7. A method for forming a pouch sheet used as an upper pouch or a lower pouch of a pouch case for a secondary battery using the system defined in claim 1, the method comprising:
   placing the pouch sheet on the mold;
   guide forming the pouch sheet by seating the open bottom end of the chamber on the edge portion of the pouch sheet by lift-up of the mold or lift-down of the chamber; and
   after the step of guide forming, pressure forming the pouch sheet to conform the pouch sheet to the mold using a fluid while supplying the fluid via the fluid input valve at the top end of the chamber and discharging the fluid via the fluid output valve adjacent the open bottom end of the chamber.

8. The method for forming a pouch sheet according to claim 7, wherein the pouch sheet is heated during the guide forming and/or the pressure forming.

9. The method for forming a pouch sheet according to claim 8, wherein the pouch sheet is composed of insulation layer/aluminum thin film/adhesion layer, materials of the insulation layer and the adhesion layer are polymer, and the pouch sheet is heated at a temperature that is lower than or equal to a temperature at which endothermic reaction starts in a material having a lowest deformation temperature from the polymer materials of the pouch sheet.

10. The method for forming a pouch sheet according to claim 8, wherein the pouch sheet is composed of insulation layer/aluminum thin film/adhesion layer, materials of the insulation layer and the adhesion layer are polymer, and the pouch sheet is heated in a temperature range in which endothermic peak is observed in a material having a lowest deformation temperature from the polymer materials of the pouch sheet.

11. The method for forming a pouch sheet according to claim 8, wherein the pouch sheet is heated at 100° C. or less.

12. The method for forming a pouch sheet according to claim 8, wherein the pouch sheet is heated in a range of 140~160° C.

13. The method for forming a pouch sheet according to claim 7, wherein the fluid output valve is closed within a pressure-resistant range of the chamber to fill the chamber with the fluid, and when forming is completed, the fluid output valve is opened to discharge the fluid out of the chamber.

14. A method for forming a pouch sheet used as an upper pouch or a lower pouch of a pouch case for a secondary battery, the method comprising:
   placing a pouch sheet on a mold;
   guide forming the pouch sheet by pressing an edge portion of the pouch sheet with an open bottom end of a chamber; and
   after the step of guide forming, pressure forming the pouch sheet to conform to the mold by supplying a fluid to the pouch sheet via a fluid input valve at a top end of the chamber and discharging the fluid via a fluid output valve adjacent the open bottom end of the chamber.

15. The method for forming a pouch sheet according to claim 14, wherein the fluid is a high pressure gas.

16. The method for forming a pouch sheet according to claim 14, wherein the pouch sheet is heated during the guide forming and/or the pressure forming.

17. The method for forming a pouch sheet according to claim 16, wherein the pouch sheet is composed of insulation layer/aluminum thin film/adhesion layer, materials of the insulation layer and the adhesion layer are polymer, and the pouch sheet is heated at a temperature that is lower than or equal to a temperature at which endothermic reaction starts in a material having a lowest deformation temperature from the polymer materials of the pouch sheet.

18. The method for forming a pouch sheet according to claim 16, wherein the pouch sheet is composed of insulation layer/aluminum thin film/adhesion layer, materials of the insulation layer and the adhesion layer are polymer, and the pouch sheet is heated in a temperature range in which endothermic peak is observed in a material having a lowest deformation temperature from the polymer materials of the pouch sheet.

19. The method for forming a pouch sheet according to claim 16, wherein the pouch sheet is heated at 100° C. or less.

20. The method for forming a pouch sheet according to claim 16, wherein the pouch sheet is heated in a range of 140~160° C.

21. The system for forming a pouch sheet according to claim 1, wherein the chamber is seated on the edge portion of the pouch sheet so that the chamber comes into contact with the edge portion of the pouch sheet.

* * * * *